US008714457B2

(12) United States Patent
August et al.

(10) Patent No.: US 8,714,457 B2
(45) Date of Patent: *May 6, 2014

(54) NETWORKED LOYALTY CARDS

(75) Inventors: Jason August, Toronto (CA); James Cassidy, Waterloo (CA); Robert Griffin, Richmond Hill (CA); John K. Stevens, Stratham, NH (US)

(73) Assignee: Visible Assets, Inc., Mississauga, Ontario (CA)

( * ) Notice: Subject to any disclaimer, the term of this patent is extended or adjusted under 35 U.S.C. 154(b) by 398 days.

This patent is subject to a terminal disclaimer.

(21) Appl. No.: 12/028,483

(22) Filed: Feb. 8, 2008

(65) Prior Publication Data
US 2009/0212117 A1 Aug. 27, 2009

Related U.S. Application Data

(63) Continuation-in-part of application No. 11/353,766, filed on Feb. 14, 2006, and a continuation-in-part of application No. 11/677,037, filed on Feb. 20, 2007, now Pat. No. 7,675,422, and a continuation-in-part of application No. 11/461,443, filed on Jul. 31, 2006, now Pat. No. 7,277,014, which is a continuation of application No. 11/276,216, filed on Feb. 17, 2006, now Pat. No. 7,164,359, which is a continuation of application No. 10/820,366, filed on Apr. 8, 2004, now Pat. No. 7,049,963.

(60) Provisional application No. 60/889,198, filed on Feb. 9, 2007, provisional application No. 60/461,562, filed on Apr. 9, 2003.

(51) Int. Cl.
G06K 19/00 (2006.01)
G06Q 10/08 (2012.01)
A01K 11/00 (2006.01)
G06K 19/07 (2006.01)

(52) U.S. Cl.
CPC .............. *G06Q 10/08* (2013.01); *A01K 11/004* (2013.01); *A01K 11/008* (2013.01); *G06Q 10/087* (2013.01); *G06K 19/0723* (2013.01)
USPC ...................... 235/492; 340/572.1; 340/572.3; 340/572.4

(58) Field of Classification Search
USPC .................................................. 235/492, 493
See application file for complete search history.

(56) References Cited

U.S. PATENT DOCUMENTS 4,190,830 A 2/1980 Bell
4,750,197 A 6/1988 Denekamp et al.
(Continued)

FOREIGN PATENT DOCUMENTS

WO 2006035401 A2 4/2006

OTHER PUBLICATIONS

Makimoto et al. "Evolution of Low Power Electronics", International Symposium on Low Power Electronics and Design, 2003, all pages.*

(Continued)

*Primary Examiner* — Christopher Stanford
(74) *Attorney, Agent, or Firm* — Larson & Anderson, LLC

(57) ABSTRACT

A networked card for identifying and tracking animate and inanimate objects and personnel, the card including: a radio frequency modem operable at a low radio frequency not exceeding one megahertz, the modem including a full duplex transmitter and receiver; a loop antenna operatively coupled with the radio frequency modem, the antenna operable within a range of hundreds of feet; a programmable microprocessor operatively coupled with the radio frequency modem and fully programmable within a network; a memory operatively coupled with the programmable microprocessor, the memory holding identification data; and a battery for providing power to the microprocessor.

18 Claims, 7 Drawing Sheets

(56) References Cited

U.S. PATENT DOCUMENTS

| | | | |
|---|---|---|---|
| 4,961,028 A | 10/1990 | Tanaka | |
| 5,231,273 A * | 7/1993 | Caswell et al. | 235/385 |
| 5,484,997 A * | 1/1996 | Haynes | 235/492 |
| 5,517,188 A | 5/1996 | Carroll et al. | |
| 5,517,194 A * | 5/1996 | Carroll et al. | 340/10.34 |
| 5,519,380 A * | 5/1996 | Edwards | 340/573.4 |
| 5,519,381 A | 5/1996 | March et al. | |
| 5,565,857 A * | 10/1996 | Lee | 340/5.42 |
| 5,745,037 A * | 4/1998 | Guthrie et al. | 340/573.4 |
| 5,920,287 A | 7/1999 | Belcher et al. | |
| 5,969,595 A | 10/1999 | Schipper et al. | |
| 6,084,513 A * | 7/2000 | Stoffer | 340/572.2 |
| 6,127,976 A | 10/2000 | Boyd et al. | |
| 6,195,006 B1 | 2/2001 | Bowers et al. | |
| 6,236,911 B1 | 5/2001 | Krueger et al. | |
| 6,280,544 B1 | 8/2001 | Fox et al. | |
| 6,294,997 B1 | 9/2001 | Paratore et al. | |
| 6,318,636 B1 | 11/2001 | Reynolds et al. | |
| 6,323,566 B1 * | 11/2001 | Meier | 307/10.2 |
| 6,329,944 B1 | 12/2001 | Richardson et al. | |
| 6,354,493 B1 | 3/2002 | Mon | |
| 6,373,389 B1 | 4/2002 | Przygoda et al. | |
| 6,377,203 B1 | 4/2002 | Doany | |
| 6,452,340 B1 | 9/2002 | Morrissey et al. | |
| 6,496,806 B1 | 12/2002 | Horwitz et al. | |
| 6,512,478 B1 | 1/2003 | Chien | |
| 6,608,551 B1 | 8/2003 | Anderson et al. | |
| 6,720,883 B2 | 4/2004 | Kuhr et al. | |
| 6,724,308 B2 | 4/2004 | Nicholson | |
| 6,745,027 B2 | 6/2004 | Twitchell et al. | |
| 6,927,687 B2 | 8/2005 | Carrender et al. | |
| 7,034,683 B2 | 4/2006 | Ghazarian | |
| 7,049,963 B2 | 5/2006 | Waterhouse et al. | |
| 7,138,920 B2 | 11/2006 | Nyfelt | |
| 7,164,359 B2 | 1/2007 | Waterhouse et al. | |
| 7,327,250 B2 | 2/2008 | Harvey | |
| 2004/0118930 A1 * | 6/2004 | Berardi et al. | 235/492 |
| 2004/0201454 A1 * | 10/2004 | Waterhouse et al. | 340/10.1 |
| 2006/0128023 A1 | 6/2006 | Waterhouse et al. | |

OTHER PUBLICATIONS

Evans et al., "A Los Cost Radio for an Electronic Price Label System", Bell Labs Technical Journal, 1996, all pages.*

* cited by examiner

NETWORKED LOYALTY CARDS

CROSS-REFERENCE TO RELATED APPLICATIONS

This application is a non-provisional of, and claims priority from, U.S. Application Ser. No. 60/889,198 filed Feb. 9, 2007, and, is a continuation-in-part of U.S. application Ser. No. 11/353,766 filed Feb. 14, 2006, and of U.S. application Ser. No. 11/677,037 filed Feb. 20, 2007, now U.S. Pat. No. 7,675,422. U.S. application Ser. No. 11/677,037 is a continuation-in-part of U.S. application Ser. No. 11/461,443, "Networked RF Tag for Tracking Animals," filed Jul. 31, 2006, now U.S. Pat. No. 7,277,014; which is a continuation of U.S. application Ser. No. 11/276,216 filed Feb. 17, 2006, now U.S. Pat. No. 7,164,359; which is a continuation of U.S. application Ser. No. 10/820,366, filed Apr. 8, 2004, now U.S. Pat. No. 7,049,963; which claims benefit of U.S. Application Ser. No. 60/461,562 filed Apr. 9, 2003.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of tracking technology and more particularly relates to the field of real-time tracking through the use of loyalty cards.

BACKGROUND OF THE INVENTION

A loyalty card, also known as a rewards card, points card, discount card, or club card, is an identifier that identifies the card holder as a member of a commercial incentives program. The identifier generally follows the form factor of a credit card-sized plastic card. Loyalty cards may be used in hotels, stores, clubs, airlines, and many other establishments desirous of tracking their customer/client base. In the case of a hotel loyalty card program, the card may be read in the lobby of the hotel, in order for the hotel to be advised that a specific client/hotel guest has arrived.

Known loyalty cards typically employ a scannable barcode or magstripe on the back of the card. The back of the card is scanned in order to authenticate the identity of the consumer and/or the transaction. Small keyring cards are often used for convenience. A retail establishment or a retail group may issue a loyalty card to a consumer who can then use it as a form of identification when dealing with that retailer. By presenting the card, the purchaser is typically entitled to either a discount on the current purchase, or an allotment of points that can be used for future purchases.

Typically, the card issuer requests or requires customers seeking the issuance of a loyalty card to provide a minimal amount of identifying or demographic data, such as name and address. Application forms usually entail agreements by the store concerning customer privacy, typically non-disclosure (by the store) of non-aggregate data about customers. Where a customer has provided sufficient identifying information, the loyalty card may also be used to access such information to expedite verification during receipt of checks or dispensing of medical prescription preparations, or for other membership privileges (e.g., access to a club lounge in airports, using a frequent flyer card).

It is also highly likely that consumer purchases are tracked and analyzed towards more efficient marketing and advertising (in fact one of the purposes of the loyalty card). There also remains the possibility that law enforcement agencies could be granted access to the stored information during an investigation of a customer's activities. For example, in 2004, a Winn-Dixie key-ring card was left behind at the scene of the crime, which led police to the perpetrator of the crime.

In the U.S., several major supermarket chains and at least one major pharmacy require the cards in order for customers to receive the advertised loyalty price. These include Kroger and Safeway (each through both their own name and many of their regional chain names), Albertsons, Winn Dixie, Harris Teeter, Ingles, Giant Eagle, Tops, and CVS/pharmacy. Some have tie-ins with airline frequent flyer programs, and some agree to donate a percentage of sales to a designated charity.

The practice is also common among book and music retailers, from large chains to independent retailers. In some instances, the customer purchases the card and receives a percentage discount on all purchases for a period of time (often one year), while in other instances, a customer receives a one-time percentage discount upon reaching a specified purchase level. (For example, a bookseller's loyalty card program might provide a customer with a 10% off coupon once the customer has spent $200.00 at the bookseller.) Best Buy's loyalty program similarly offers points redeemable for dollar-amount discounts after accumulating a set number of points along with other discounts from time to time, though the card is not required to receive their advertised price in most cases. In addition, office supply retailers Staples, Inc. and Office Depot started issuing club cards in 2005.

Almost all of the major hotel chains (Best Western, Choice Hotels, Holiday Inn, Marriott, Super 8 Motels, etc.) have similar cards that allow guests to earn either points (redeemable for discounts, future stays or other prizes) or airline miles (Hilton's HHonors program allows guests to earn both points and miles on the same stay, the only program to date that does so). All major US Airlines also offer rewards credit cards. Two major petrol distributors have adopted the Exxon-Mobil Speedpass which is not only a loyalty token, but also contains a mechanism for authorizing electronic payment, used by over seven million customers worldwide (in 2004).

SUMMARY OF THE INVENTION

Briefly, we describe a networked card for identifying and tracking animate and inanimate objects and personnel, the card including: a radio frequency modem operable at a low radio frequency not exceeding one megahertz, the modem including a full duplex transmitter and receiver; a loop antenna operatively coupled with the radio frequency modem, the antenna operable within a range of hundreds of feet; a programmable microprocessor operatively coupled with the radio frequency modem and fully programmable within a network; a memory operatively coupled with the programmable microprocessor, the memory holding identification data; and a battery for providing power to the microprocessor.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1A:
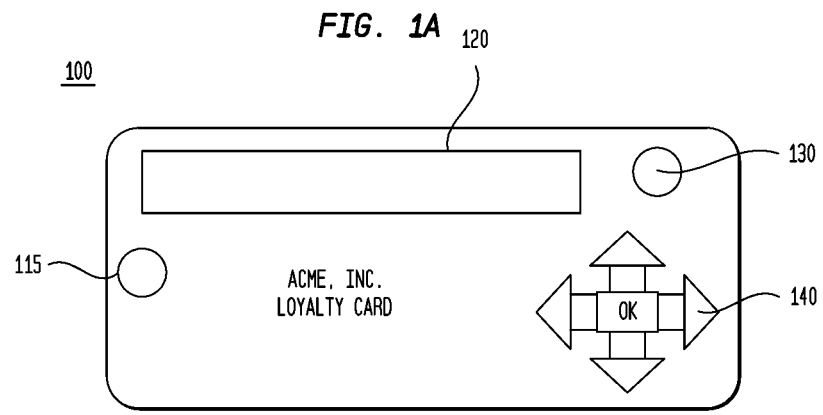
FIG. 1a shows the face of a loyalty card, according to an embodiment of the present invention.

While the invention as claimed can be modified into alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the scope of the present invention.

DETAILED DESCRIPTION

We describe a networked loyalty card for operating at a low frequency, useful for identifying animate and inanimate objects and individuals. The networked loyalty card is based on the IEEE P1902.1 protocol that has significant advantages over known tracking cards using RFID technology. With the networked loyalty card, a hotel guest can enter a hotel lobby with the card in his/her wallet and by the time the guest reaches the front desk the hotel has already identified the guest and begun the check-in process. This is possible because the networked loyalty card can be read through a person, or a wallet or handbag. The card, using the P1902.1 protocol and a standard antenna, can be detected from fifty feet away and in any direction. The card does not have to be pointed in the direction of the card reader. With a larger antenna, the card signal can be detected from any direction within a one-hundred foot range. Additionally, the card is able to store much more data than known loyalty cards using RFID technology. The networked loyalty card can store upwards of 1,000 bytes.

Additionally, according to an embodiment of the present invention, specific preferences can be highlighted relating to that hotel guest (e.g. preferences for: wake up calls, restaurant bookings, room service, table seating).

Pop-up windows may be used as part of the hotel management software to alert the concierge or hotel staff that the guest has arrived at the hotel. Other areas or regions within or external to the hotel (such as a pool area or tennis area) may be similarly equipped with volume read loop antennas according to the present invention.

Referring to FIG. 1a there is shown a loyalty card 100 in a credit card form factor, according to an embodiment of the present invention. The card is about the same thickness as a credit card and can contain 4-bit processors, making them programmable. They also conserve power, allowing for a battery life of 10 years or more.

The loyalty card 100 uses a low frequency (not exceeding 1 megahertz, and typically under 300 KHz) and a base station design that uses large loop antennas (such as 10×10 feet to 500×500 feet). It transmits a digital ID to selectively activate a signal within the effective range of a volume read loop antenna. We use both a simple polled protocol as well as on-demand communications from the card 100.

Each such card 100 uses a full duplex transmitter and receiver (transceiver), as opposed to a transponder design used in RFID tags and RF Tags. In addition, these Networked RF Cards (NRF Cards) have significantly reduced power consumption, and long range (1000 sq feet to 10,000 sq feet per antenna), have the power capacity to add displays (e.g. LCD) and light emitting diodes (LED's) and detectors, and buttons so they may become fully interactive "card clients" (this is not possible with a transponder). These low frequencies are generally understood to have very short range (inches), have the disadvantage of limited transmission speed, but have the distinct advantage of operating in harsh environments with reduced interference (see Mar. 19, 2003 RFID Journal "Goodyear Opts for 125 KHz Tire Tag"). However, the range problem is solved by using full duplex communications and a base station with large loop antennas; moreover, the communication speed is not a serious issue in any of the expected applications.

Low frequencies make it possible to use low speed low-power integrated circuits. These integrated circuits may be fabricated using 4 micron CMOS (complementary metal oxide semiconductor) for only 10 to 20 cents and use a standard flat (quarter size) alkaline battery or a lithium battery. The small size makes it ideal for use in a credit card form factor. The low frequencies provide extremely low power consumption and make it possible to leave the receiver on at all times, drive an LCD display at all times, transmit back to the base station as many as 100,000 times, yet the card 100 enjoys a lifetime of a minimum five years to a maximum 20 years (lithium battery).

The loop antennas have the advantage of communication to modules only contained within the loop, or depending upon the communications mode (AM of FM, or PM) up to one diameter away from the loop. This also makes it possible to estimate the location of an item down to the size of the loop approximately. These non-transponder NRF Cards are novel identification cards which have the ability to transmit and receive in the manner of any radio device and do not depend upon reflection of reader signals.

The cards have a range of hundreds of feet, and have a long battery life (e.g. 10 years) with miniature button batteries, and only one or two active components. They can do this because they use very low frequencies (below 1 megahertz and preferably under 300 kilohertz) for both transmission and reception.

The card is low-cost with full two duplex way transmission and reception, can be fully programmable within the network, and as many as 10,000 or more can all function within a network as clients, with a ten to fifteen year battery life. This card 100 may be equipped with an optional LCD display 120. These cards fit easily in a wallet and can also be easily attached to a file or container using tape or other adhesive means.

Optionally, a hole 115 can be provided for securing the card 100 to a lanyard or keychain. Thus the card may be used by an individual as identification or used in conjunction with shipping data to store other shipping information such as addresses, freight contents, weight size, and shipping IDs with full programmable features.

The card 100 has additional unique features including the optional LCD display 120 as well as optional light emitting diodes (LED) 130. The LED's 130 may be different colors. The display 120 can be used to show a membership status or other identifying information.

The card 100 may also have several buttons 140 placed on its face that can be used to confirm any action associated with a transaction, or to scroll information contained in the card on the LCD display 120. In addition the card 100 may be read as it passes through a "reading tunnel," on a conveyor and/or automatically sorted, similar to systems now based on barcodes. A single large loop antenna, or multiple overlapping loop antennas placed either in the floor or ceiling or on shelves can be used to interrogate the cards 100, read data and status and find the approximate location of the customer in the store or hotel lobby. This ability to network many cards as clients within a region makes many other functions possible within the scope of the invention.

Figure 1B:
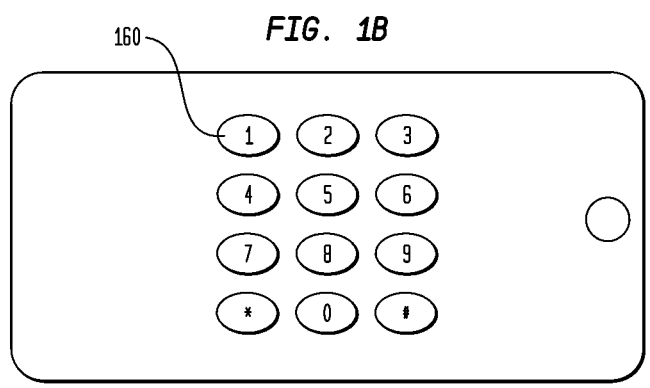
FIG. 1b shows the back of a loyalty card, according to an embodiment of the present invention.

FIG. 1b shows the back view of the card 100. The design of the card 100 includes optional buttons 160 placed on the back of the card (a flat surface), that may be optionally used to enter a PIN identification number by the customer prior to scanning. These buttons 160 may be of soft rubber or other compliant material. The compliant material should have sufficient tensile strength to allow the buttons 160 to resume their original shape after deformation. The compliance of the buttons 160 will also serve as a shock absorber for the card 100. The same buttons 160 may also be used to confirm identity of the card holder via PIN numbers.

Figure 1C:
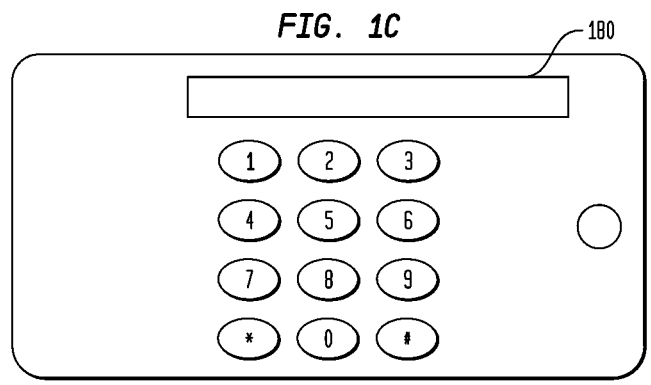
FIG. 1c shows a magnetic strip on the back surface of the loyalty card, according to another embodiment of the present invention.

Referring to FIG. 1c there is shown an alternate embodiment with a magnetic strip 180 deposited on the back surface of the card 100. This strip 180 can be recorded with identification information from a card holder. This electronic recording is similar to methods for recording data on credit cards and computer disks and is well known in the art. Identification data such as biometric data can be recorded on the magnetic strip 180 according to known methods. The identification data can be stored in centralized data storage.

Cards 100 may also be introduced that have no LCD display 120, no buttons 140 and 160 and no LEDs 130, at a reduced cost. These inexpensive cards may be used simply to identify the card holder and/or the card holder's loyalty agreement.

Another unique feature of this system is its ability to be programmed within a network, providing the server knows the ID of the loyalty card holder, or by a very low-cost handheld device, in the store, club, or hotel. A card 100 can be programmed at the receiver's site with no knowledge of the card's ID. An Ethernet-enabled router can be used to manage the network, which lets users view each card 100 and its corresponding data over the Web. Users can use special monitoring software to view the data, or, when they properly configure the cards and the network, they can view the data on almost any search engine and, in some cases, the card 100 could serve as a reader, too.

The hand-held and card communication range may be easily controlled to a few inches or even a few feet depending upon the size of the loop antenna used for communication contained in the handheld, as well as power supplied to the antennas. This provides the ability for an individual to walk up to a customer with the hand-held, and interrogate the card ID status, or reprogram the card 100, or carry out any other maintenance function without any prior knowledge of the ID number or any other data that may be contained in a separate database—it is done based simply by locating the physical card 100. These features will undoubtedly be limited to specific individuals with the authority to make such changes; however this ability makes maintenance in support of the cards low-cost and allows for on-the-spot maintenance on the floor.

A final advantage of this system is its ability to transmit to a base station, independent of the base station interrogating the card 100—on-demand card transmission. This makes it possible for the card holder to send an alarm condition to the base station. The base station can be as small as the card 100 itself and can connect via a USB to a personal computer and execute commands for communicating to multiple cards in its range (in this example, approximately a 24-foot radius). The base station is a two-way transceiver for communicating with the cards 100.

Communications Protocol

Each loyalty card 100 may have many IDs programmed into its memory. When manufactured all cards have the same master ID, typically 00000000. The handheld or a special programming device (a base station) connected to a computer with limited range, sends out this unique master ID. The card has an always-on receiver and reads the transmitted ID, it compares this with the IDs contained in its memory and if it finds a match, transmits a signal containing the transmitted ID back to the transmitter, indicating that it is now full open to handle communication. The base station, may then provide the loyalty card 100 with one or more unique ID numbers which may simply be a unique customer number, or other unique ID, as well as any information it may require to function. The card 100 is also provided with several random numbers stored in its memory that can be used to delay un-solicited transmissions to the base station to minimize likelihood of collisions.

The loyalty card 100 may also initiate communication, by transmitting its ID to a base station. This could be in response to a button push or in response to an event such as a transaction or loyalty membership upgrade. In the rare case when two cards simultaneously transmit, the IDs will be non-readable and the base station will send out a signal indicating an error has occurred. Two possible protocols may be initiated. The cards may be instructed to re-transmit, using a random delay stored in each card's memory register, to eliminate the overlap. Alternatively, that server may simply poll all cards in the field, one-by-one, until it locates the two cards that transmitted the signals.

Figure 2:
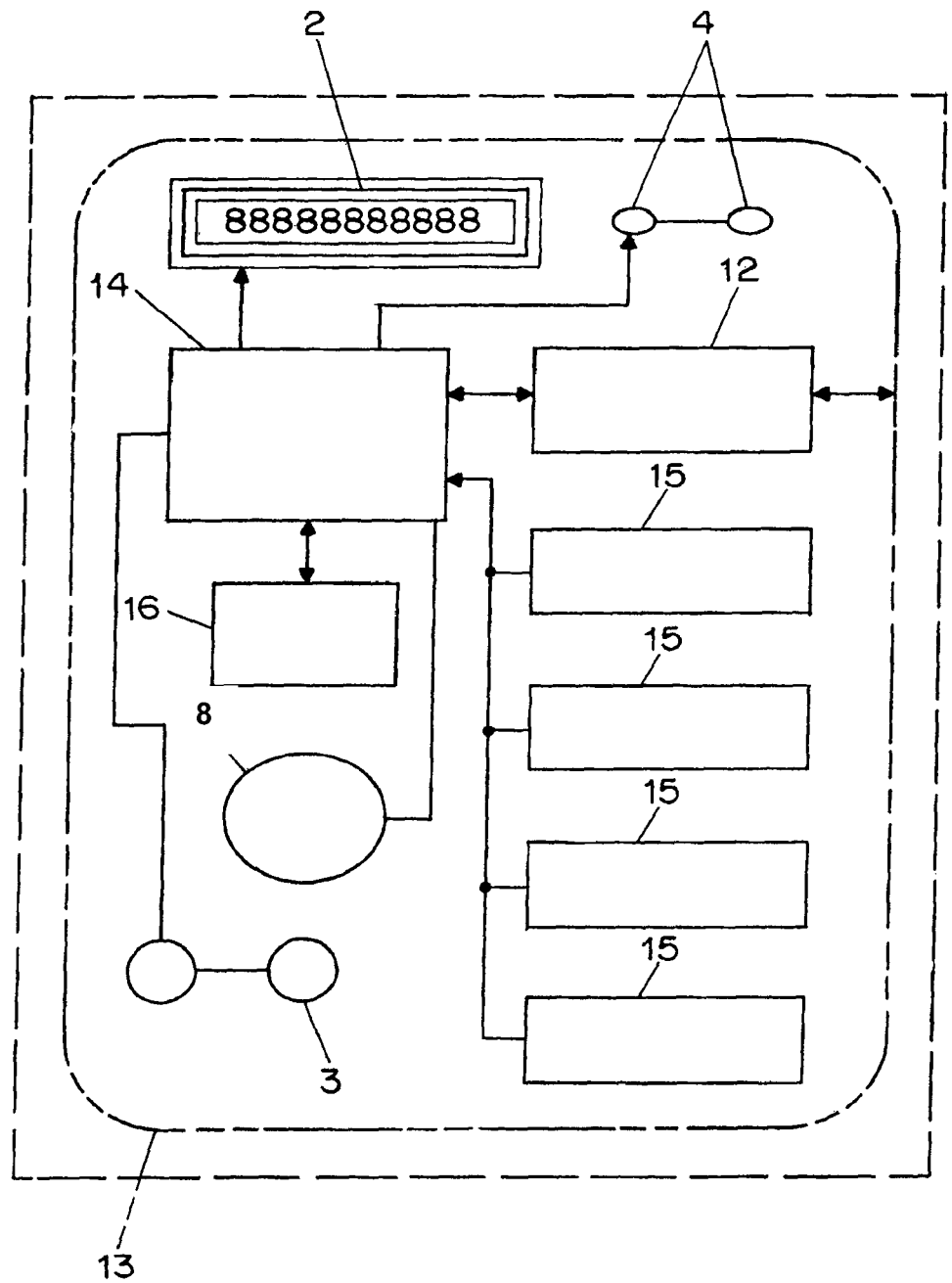
FIG. 2 is a schematic block diagram depicting the functional components of a loyalty card in accordance with the invention.

FIG. 2 is a block diagram showing functional components of a typical loyalty card 100. The heart of the loyalty card is a custom radiofrequency modem 12, created on a custom integrated circuit using 4 micron CMOS technology. This custom modem 12 is designed to communicate (transmit and receive), through a loop antenna 13, made of thin wire wrapped many times around the outside edge of the card 100. All communications take place at very low frequencies (e.g. under 300 kHz). By using very low frequencies the range of the card 100 is limited; however power consumption is also greatly reduced. The receiver of modem 12 may be on at all times and hundreds of thousands of communication transactions can take place, while maintaining a life of many years (e.g. up to 15 years) for battery 8. The typical freight card 100 may also include a memory 16 and a four bit microprocessor 14, using durable, inexpensive 4 micron CMOS technology and requiring very low power, with onboard LCD drivers, to control and drive the LCD display 120, as well as drivers for the LED's 130 and the ability to detect and read analog voltages from various optional detectors 15 and read inputs from buttons 140.

Volume Read Loop Antennas

Figure 3:
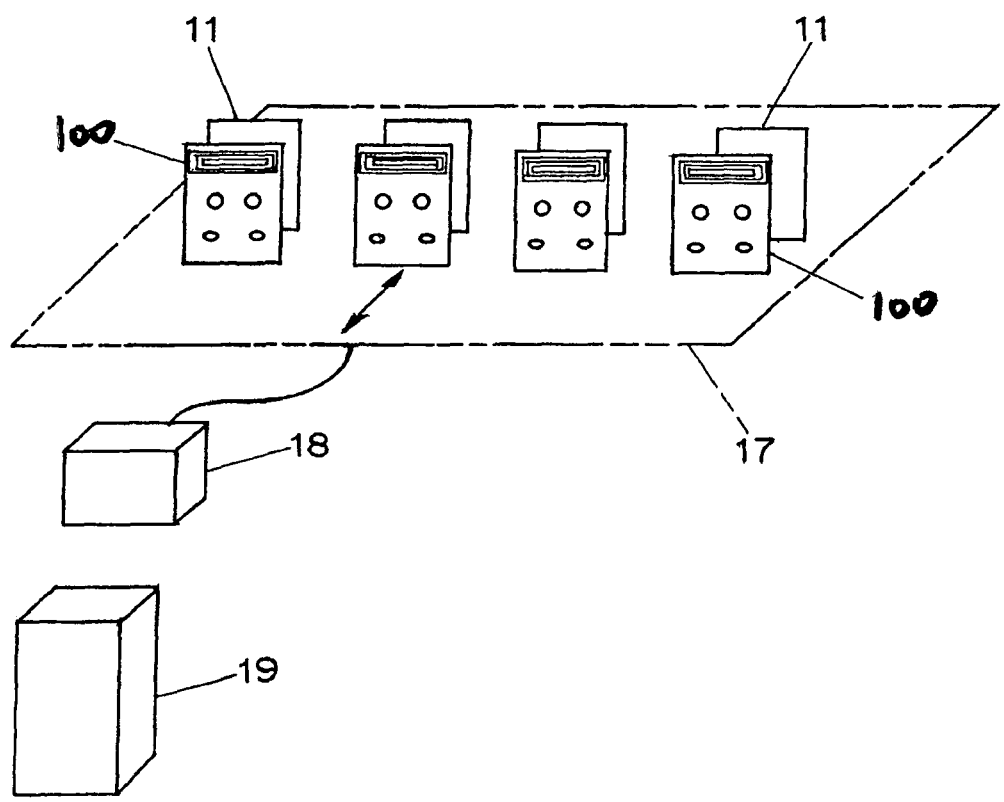
FIG. 3 is a schematic view of a number of low frequency cards together with a large loop antenna and other components for reading the cards and communicating the information.

FIG. 3 shows how these novel loyalty cards 100 may be used as clients within a network served by a larger loop antenna 17 in a hotel setting. The larger antenna 17 may be placed in the lobby floor or check-in area, ceiling or in a hotel restaurant. One additional advantage of using low-frequency communication for the system, is the fact these low (e.g. 300 kHz) frequencies do not reflect from steel or metal. In fact, they are often enhanced and refocused effectively by steel shelves or other large iron frames. This is in stark contrast to current RFID technology which works poorly in areas with liquid and/or metals.

In many cases the antenna 17 may simply be wrapped around large steel shelves and the cards will all be contained within the inductive low-frequency field. The loop antennas 17 can be up to several hundred feet around. However, as they get larger, the ability to detect individual card 100 decreases, and the power required to transmit to the card increases.

Low-frequency communication has relatively low noise with antennas 17 in the range of 100 feet by 100 hundred feet, however at 500 feet by 500 feet they begin to detect thunderstorms occurring at a distance—often within 4 or 500 miles away from the antenna 17. Thus, the optimal size for these antennas 17 is on the order of about 100 by 100 feet. However, many such antennas 17 can be placed within a hotel or store to create a checkerboard array for communication to any point. This also makes it possible to localize a specific card 100 within a large hotel at least within the distance of an antenna square. A single base station 18 can be used to connect to all such antennas 17 by time division multiplexing, or the like.

The antenna 17 is connected to a base station 18 which in turn is operatively connected to a server 19 or other computer controlling mechanism; thus enabling information transmitted from the card 100 to be read via the Internet. The base station 18 is able to transmit and receive at much higher power than the card 100, but as long as the cards are contained within a loop 17, base station 18 can identify and talk to each card individually. The optimal protocol for this network is for the base station 18 to address the card 100 based on a known ID. In other words, the optimal protocol requires that the server 19 have a database of IDs found in the loop antenna 17 when using networks of cards 100. As will be understood, for addressing of an individual card 100 from the internet, the card 100 may be provided with an IP address.

Figure 4:
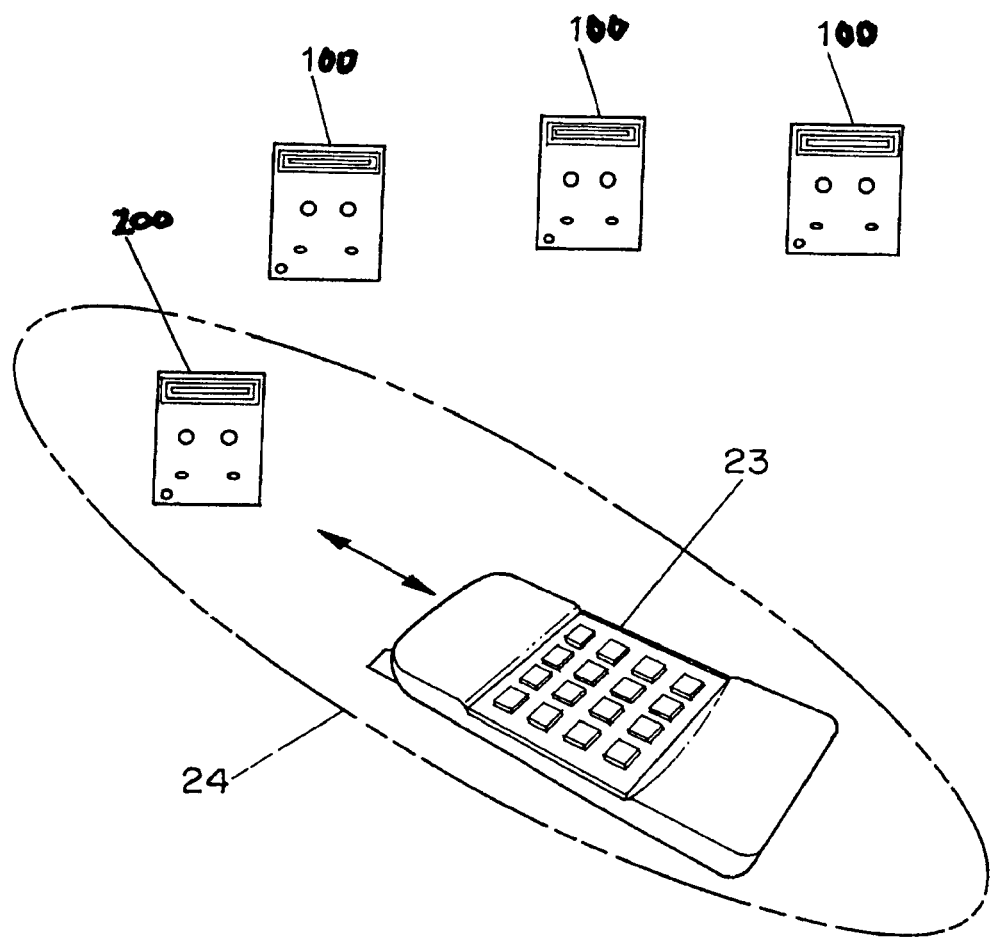
FIG. 4 is a schematic view showing the use of a handheld reader to interrogate a selected individual loyalty card.

FIG. 4 shows a handheld reader 23 with a limited transmission and reception range 24. By limiting the loop size of the antenna 17 (not shown) that is contained in the handheld reader 23, as well as in the card 100 itself, the handheld reader 23 may be used to selectively communicate with an individual card 100 by disposing reader 23 to within a distance of a few loop diameters of the handheld's antenna 17. This limited range ability can only be achieved easily when using low-frequency (not exceeding 1 megahertz) loop communications. This ability makes it possible to selectively read and write information to a selected card 100 without prior knowledge of the card's ID. Moreover, a concierge may be able to read information from card 100 by simply placing the handheld reader within 4-5 inches of the selected card 100 and moving the reader 23 back-and-forth along the direction of the 2-headed arrow, in much the same way as a bar-code might be scanned.

Figure 5:
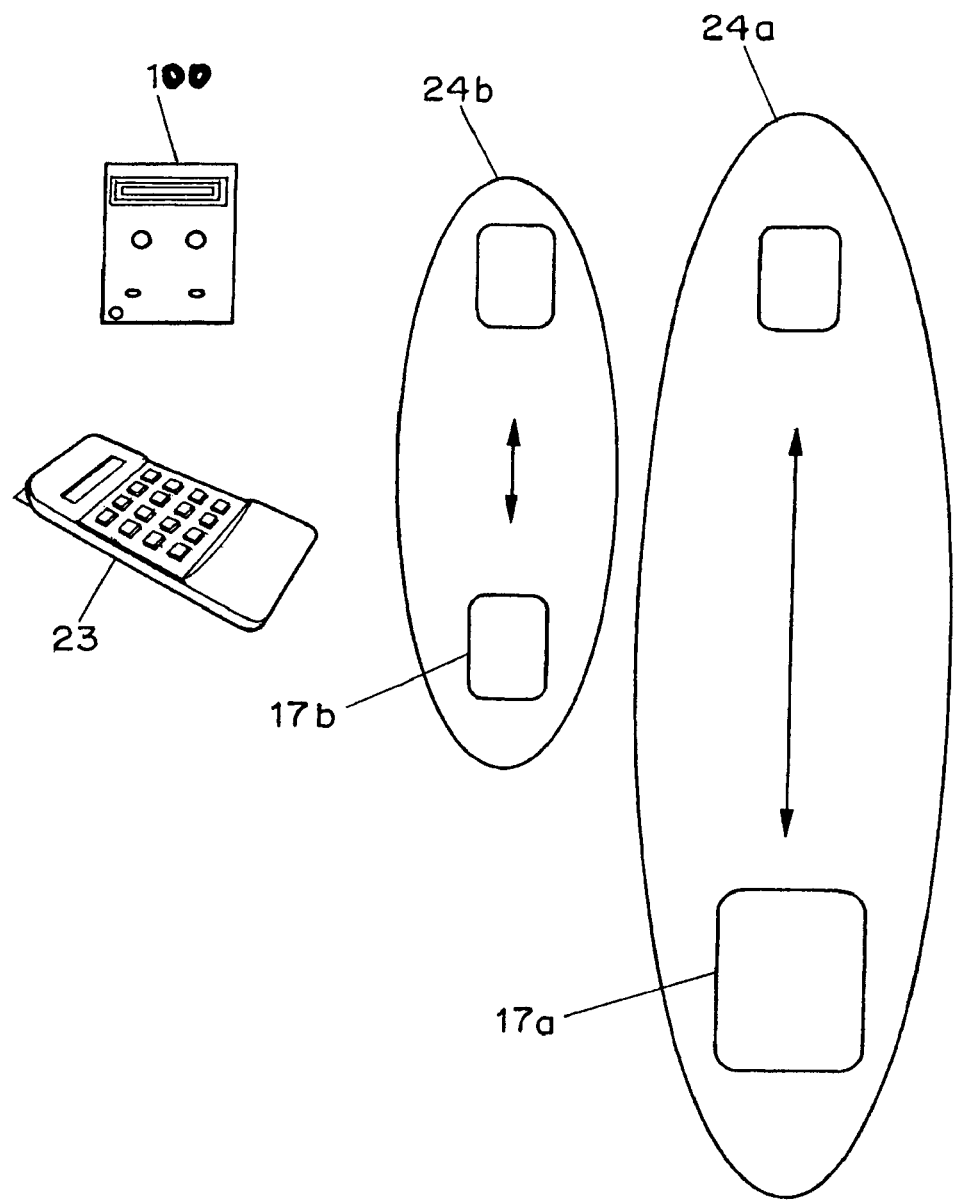
FIG. 5 is a schematic view showing the use of a handheld reader to interrogate loyalty cards with a reader; antennas of different sizes for different communication ranges.

FIG. 5 shows that the distance between the hand-held and the tag for effective communications may be altered by simply changing the size of the small loop antennas 17. If a large antenna 17a is used in the handheld reader 23, the transmission reception range (Rx/Tx) 24a can be several feet, while the Rx/Tx range 24b of a smaller antenna 17b may be limited to several inches. This ability to alter the range by antenna design 17 makes programmability and reading simple and low-cost.

Note that a handheld reader is just one format for reading the card 100. The card may be read by any data processing system configured to read signals transmitted by the card 100. Software applications can process the information on the card 100 in conjunction with information stored in the computer or accessed via a data storage device and/or the Internet to provide optimal use of the card 100. Those with knowledge in the art will appreciate the myriad of applications and uses that are possible with the loyalty card 100 and a data processing device configured to operate with the card 100.

Loyalty Card As Identification Card

The loyalty cards may also be used to identify and monitor individuals (customers, hotel guests, club guests) to allow entry into restricted areas by using the same basic systems described above, and track the individuals within the buildings as they move from place to place. The face of the card 100 in this case may contain a picture ID, and the back could retain the button array 160. At critical entry points the user may, for example, be required to enter in a PIN number using buttons on the card 100 as his positive identification.

Figure 6:
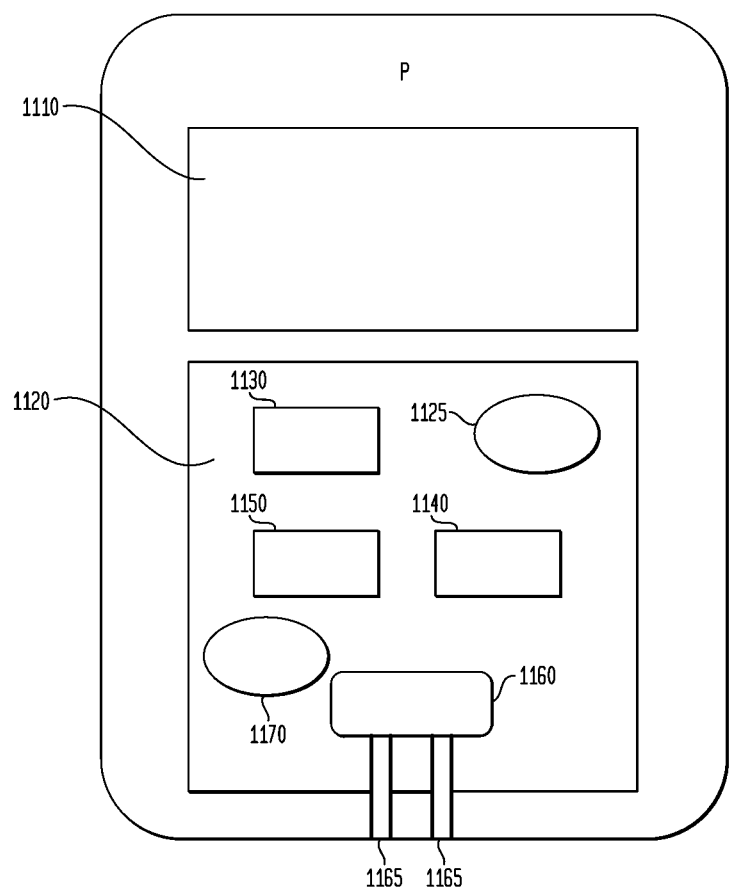
FIG. 6 is a schematic view of a loyalty card in the form of a passport, in accordance with the invention.

FIG. 6 shows a loyalty card 1100 for identifying individuals. The card 1100 comprises a visual display portion 1110 operable to display identification data (e.g. photo, textual information) relating to an individual, as well as a wireless communication portion 1120 operable to receive data queries and transmit data wirelessly. As shown in FIG. 6, the aforesaid wireless communication portion 1120 comprises an antenna 1125, transceiver 1130, data storage device 1140, data processor 1150, and energy source 1160. The wireless communication portion 1120 is operable at a low radio frequency not exceeding 1 megahertz, which permits a low rate of energy consumption and thus extends the life of the energy source 1160 where it is a stored energy source, such as a battery (up to 15 years). The transceiver 1130 is operatively connected to antenna 1125 and is operable to transmit and receive data at the aforesaid low radio frequency (e.g. 128 hertz). The data storage device 1140 (e.g. a flash memory or the like) is operable to store data comprising the individual's name, passport number and date and place of issuance or other identification data for identifying the individual. Data processor 1150 is programmed and operable to process data received from the transceiver 1130 and from data storage device 1140 and to send data to cause the transceiver 1130 to emit an identification signal based upon the aforesaid identification data stored in the data storage device 1140.

Energy source 1160, which is operable for activating transceiver 1130 and data processor 1150, may be a rechargeable battery with a pair of connectors 1165 which can be used to charge the battery. Alternatively, the energy source 1160 is selected from a long-life replaceable battery, a solar cell, a pair of electrical connectors connectable to a mating pair connectors extending to a power supply, and a tag energization antenna operable to receive radio frequency energy from an ambient radio frequency field of a second radio frequency.

Advantageously, data storage device 1140 can store a temporal history of data queries that have been received by the passport P 1100. Moreover, data processor 1150 may be programmed to cause transceiver 1130 to automatically transmit this temporal history at the low radio frequency upon receipt by transceiver 1130 of a data signal that corresponds to the identification data stored at data storage device 1140.

As shown in FIG. 6, wireless communication portion 1120 comprises a clock 1170 operable to emit clock signals. Data processor 1150 receives the clock signals and is programmed to encrypt the stored data in response to the received data and to the clock signals for transmission by transceiver 1130 as encrypted data. The clock 1170 may, of course, include a crystal oscillator (an electronic circuit that uses the mechanical resonance of a vibrating crystal of piezoelectric material to create an electrical signal with a very precise frequency which is commonly used to keep track of time). As will be understood, the energy source 1160 also serves to activate clock 1170. Thus it is preferred that a battery (replaceable or rechargeable) be used as the energy source 1160 because the clock 1170 must be energized continuously in order to give an accurate timing signal. Techniques to carry out suitable encryption are well known to persons skilled in the security field. For example, reference may be had to U.S. Pat. No. 5,598,475, issued Jan. 28, 1997, U.S. Pat. No. 6,154,544, issued Nov. 28, 2000, and to U.S. Pat. No. 7,049,963, issued May 23, 2006; each of these three U.S. patents is incorporated herein by reference.

Figure 7:
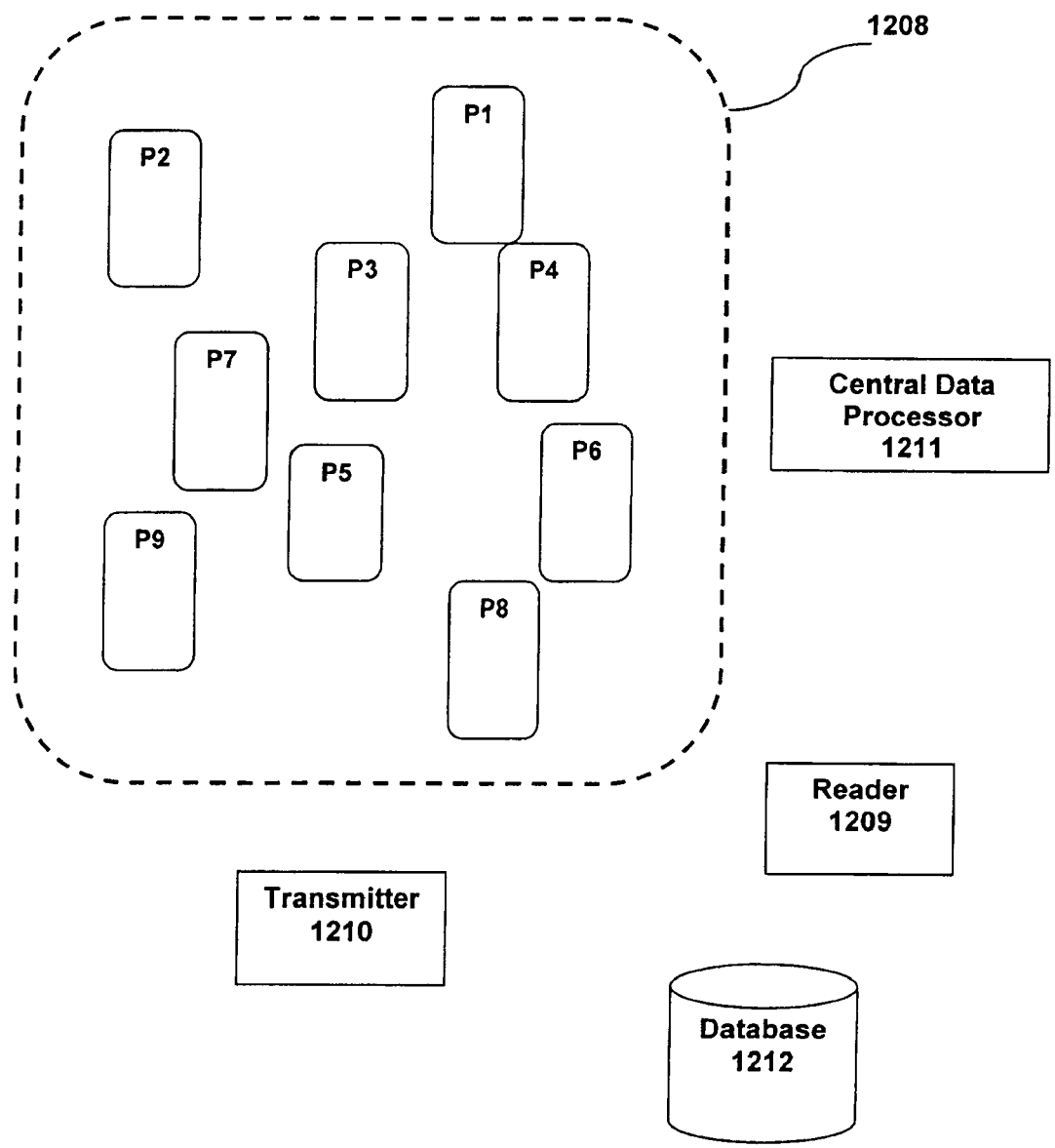
FIG. 7 is a schematic view of a system for monitoring identification data relating to card holders in accordance with the invention.

FIG. 7 shows a system for monitoring identification data relating to hotel guests at a hotel lobby point of entry. The system comprises an identification device, such as the loyalty card 1100, which is carried by each individual. Each of the cards, denoted as P1 to P9 in FIG. 7, comprises the components described hereinabove and shown in FIG. 6.

The system shown in FIG. 7 further comprises a field communication antenna 1208, a reader 1209, a transmitter 1210, a central data processor 1211 and a stored database 1212. Field communication antenna 1208 is disposed within a distance from each card P1-P9 to permit effective communication with cards P1-P9 at the selected low radio frequency (e.g. 450 hertz). Reader 1209 is in operative communication with the field communication antenna 1208 and receives identification data (and encrypted data where encryption has been carried out) from each card P1-P9. Transmitter 1210, which may typically comprise an oscillator at the selected communication frequency, is in operative communication with field communication antenna 1208 to send a data query to each of cards P1-P9. Because loop antenna 1208 surrounds cards P1-P9 the entire group of cards may be queried at a distance, without need for a proximity reader, where such group queries are appropriate. One such use would be to locate and communicate with a selected hotel guest within the group of hotel guests in the lobby, perhaps to ready VIP treatment for the selected guest. Central data processor 1211 is in operative communication with reader 1209 and transmitter 1210 to transmit a data query and thereafter receive the encrypted identification data and to cause a search of a database 1212 using the encrypted identification (ID) data.

According to a preferred embodiment, the aforesaid field communication antenna 1208 comprises a large loop arranged to encircle a plurality of individuals each carrying a national passport, at a border control point.

Preferably, the aforesaid energy source comprises a tag energization antenna operable to receive radio frequency energy from an ambient radio frequency field of a second radio frequency, the aforesaid system further comprising a field energization antenna operable to produce the aforesaid ambient radio frequency at the tag energization antenna of the aforesaid individual.

While the present invention has been described with reference to preferred embodiments thereof, numerous obvious changes and variations may readily be made by persons skilled in the fields of radio frequency tags and logistics.

We claim:

1. A networked card for identifying and tracking animate and inanimate objects and personnel, said card comprising:
    a radio frequency modem operable at a low radio frequency not exceeding one megahertz, said radio frequency modem comprising a full duplex transmitter and receiver;
    a loop antenna operatively coupled with the radio frequency modem, said antenna operable at a range of hundreds of feet;
    a programmable microprocessor operatively coupled with the radio frequency modem, wherein said programmable microprocessor is fully programmable within a network;
    a memory operatively coupled with the programmable microprocessor, said memory comprising identification data for identifying the animate and inanimate objects and personnel; and
    a battery for providing power to the microprocessor.

2. The networked card of claim 1 wherein the radio frequency modem is operable to transmit and receive signals at a radio frequency under 300 kilohertz.

3. The networked card of claim 1 wherein the radio frequency modem comprises four micron complementary metal oxide semiconductor technology.

4. The networked card of claim 2 wherein the receiver of the radio frequency modem is operable to receive low radio frequency signals all the time.

5. The networked card of claim 1 wherein the antenna comprises thin wire wrapped around an outside edge of an inside housing of said networked card.

6. The networked card of claim 1 wherein the programmable microprocessor comprises four bit complementary metal oxide semiconductor technology.

7. The networked card of claim 1 wherein the battery is a small lithium battery.

8. The networked card of claim 1 further comprising:
    a display driver; and
    an onboard display visible at a front surface of said networked card, said onboard display for presenting the identification data, wherein said onboard display is operatively coupled with the programmable microprocessor.

9. The networked card of claim 8 wherein the display is a liquid crystal display.

10. The networked card of claim 8 wherein the display comprises light-emitting diodes.

11. The networked card of claim 8 further comprising at least one button disposed on a front surface of said networked card, said at least one button for use by a user of said networked card to manipulate the identification data displayed on the display.

12. The networked card of claim 11 wherein the display comprises a scroll feature operable by the at least one button.

13. The networked card of claim 1 further comprising at least one compliant knob disposed on a back surface of said networked card.

14. The networked card of claim 1 further comprising at least one sensor disposed on a surface of said networked card, said at least one sensor operable to detect a specified condition.

15. The networked card of claim 14 wherein the at least one sensor emits an alarm upon detecting the specified condition, wherein said alarm is able to be perceived by a user of said networked card.

16. The networked card of claim 1 wherein the radio frequency modem operates on a simple polled protocol.

17. The networked card of claim 1 further comprising a small hole formed through front and back surfaces of said networked card, said hole for facilitating attachment of said networked card.

18. The networked card of claim 1 wherein the identification data is transmitted from a remote storage data.

* * * * *